Patented Apr. 18, 1944

2,346,947

UNITED STATES PATENT OFFICE 2,346,947

METHOD OF SATURATING FELTED FIBROUS MATERIAL

Raymond F. Schlaanstine, Kennett Square, Pa., assignor to Hercules Powder Company, Wilmington, Del., a corporation of Delaware No Drawing. Application March 25, 1941, Serial No. 385,133

2 Claims. (Cl. 117—140)

This invention relates to asphaltic compositions and more particularly to asphaltic compositions which are essentially free from volatile components and which are adapted to be applied in the hot molten state.

Heretofore hot melt compositions of asphaltic materials have been made by fluxing the asphalt with various bituminous and non-bituminous materials. The bituminous materials most frequently used as fluxing agents are soft sludge asphalt, soft residual asphalt, soft blown asphalt, residual oils, pressure tar, and native and pyrogenous waxes. The difficulty with these products is that the blends are not always homogenous, or that impurities found in the fluxing agents are carried over into the hot melt composition.

The non-bituminous materials most frequently employed as blending agents for asphalts or the like are rosin, animal and vegetable oils or fats, and wool greases. These flux readily with asphalt or the like and yield products of fair weatherproof properties. However, none of the prior compositions has been of desirable low viscosity when molten without losing hardness, strength or flexibility excessively at ordinary temperatures. Thus, rosin, for example, produces a composition which is too brittle at ordinary temperatures while animal and vegetable oils or fats or wool grease produce a composition which is unduly soft at ordinary temperatures.

This invention has as its object the production of an asphaltic composition adapted to be applied hot and exhibiting improved properties.

Another object is to produce an improved asphaltic saturant for fibrous materials.

A further object is to produce an asphaltic composition which possesses a low degree of susceptibility to temperature changes.

A still further object is the production of an asphaltic or bituminous composition having a high degree of fluidity at temperatures above its melting point.

Another object is to provide a hot melt composition having greater heat stability, exhibiting improved electrical characteristics and possessing the property of more readily penetrating and wetting fibrous materials or other known binding materials into contact with which it is brought in the hot state.

Another object is to produce a composition of the foregoing type having greater flexibility and impact strength when solid and greater fluidity when molten than untreated asphalt of the same melting point.

Still other objects will appear hereinafter.

I have discovered that the foregoing objects may be accomplished by providing a hot melt composition essentially free from volatile components and comprising an asphaltic material such as blown asphalt, fluxed, plasticized and blended with a small amount of a liquid ester of abietic acid or hydrogenated abietic acid, the blend preferably having a melting point (ring and ball) of at least about 100° F.

In carrying out the principles of the invention, I prefer to employ an asphaltic material giving a blend having a ring and ball melting point of at least about 100° F., such as native asphalts; asphaltites like gilsonite, grahamite, or the like; asphaltic pyrobitumens such as elaterite, wurtzilite, etc.; petroleum asphalts such as straight run petroleum asphalts, steam distilled petroleum asphalts, pressure tar, sludge asphalt, blown petroleum asphalt, etc. I prefer to use blown petroleum asphalt having a melting point of at least about 140° F.

In accordance with the invention the composition as prepared consists essentially of non-volatile materials comprising the asphaltic material fluxed and plasticized with from about 1% to about 10% by weight, based on the weight of the blend, of a liquid ester of either abietic acid or hydrogenated abietic acid which is a resinous liquid at ordinary temperature (20° C.).

Examples of suitable fluxing agents adapted to be employed in accordance with the present invention are:

*Esters with lower aliphatic monohydric alcohols*

Methyl abietate
Hydrogenated methyl abietate
N-propyl abietate
Hydrogenated N-propyl abietate
Iso-propyl abietate
Hydrogenated iso-propyl abietate
N-butyl abietate
Hydrogenated N-butyl abietate
Iso-amyl abietate
Allyl abietate

*Esters with glycols having an ether linkage*

Diethylene glycol abietate
Hydrogenated diethylene glycol abietate
Triethylene glycol abietate
Hydrogenated triethylene glycol abietate

*Esters with aromatic and aralkyl alcohols*

Phenyl abietate
Alpha-naphthol abietate
Beta-naphthol abietate
Benzyl abietate
Hydrogenated benzyl abietate

*Esters with alicyclic alcohols*

Cyclohexyl abietate
Hydrogenated cyclohexyl abietate

Of these I prefer to use methyl abietate or hydrogenated methyl abietate.

I have found that the addition of relatively small amounts of liquid resinous esters of the foregoing type to asphaltic materials lowers the viscosity of the product when molten and greatly increases the speed of penetration into fibrous materials, or permits the use of lower impregnation temperatures without increasing the time required. The effect of these blending agents upon viscosity of the molten mixture is far greater than the effect upon melting point of the asphaltic material. In other words, the lowering of viscosity of the melt is substantially greater than the lowering of melting point. This is very advantageous since it allows the ready saturation or impregnation of the material with the melt without increasing the softness of the solidified melt appreciably.

Since the esters of the present invention impart a very great wetting power to the blend, the speed and effectiveness of saturation or impregnation therewith is markedly improved. In addition, since the esters of the present invention possess very desirable electrical characteristics, use thereof does not detract from the insulating powers of the asphalt or the like. Since the esters employed in accordance with the present invention are non-volatile and exhibit an extremely low vapor pressure at elevated temperatures, and since they are highly resistant to heat, their use allows the maintenance of the blend in the hot molten condition for indefinite periods of time which is of marked advantage in the application of compositions of this type. Because the composition contains no volatile components, the esters employed being completely non-volatile at atmospheric pressure and exhibiting a high flash point, no objectionable increase in fire hazard is effected by their use in the hot melt composition. Moreover, the application of the principles of the present invention enables the production of compositions of greater flexibility and impact strength in the solidified state, which is very desirable.

The following table gives the characteristics of methyl abietate, hydrogenated methyl abietate and ethyl abietate.

|  | Methyl abietate | Hydrogenated methyl abietate | Ethyl abietate |
| --- | --- | --- | --- |
| Refractive index at 20° C | 1.530 | 1.517 | 1.525 |
| Specific gravity at 20° C | 1.040 | 1.032 | 1.020 |
| Acid number | 5 | 5 | 4.2 |
| Saponification number | 25 | 24 | 5.7 |
| Boiling point °C | 360-365 | 365-370 | 170-174 |
| Viscosity at 25° C poises | 26 | 27 |  |

Since the esters used in accordance with the present invention cannot be saponified by ordinary methods, the resulting compositions are highly resistant to the action of alkalies which is particularly advantageous where the products are used in the manufacture of mastic flooring, linoleum, floor tile, and floor coverings generally, and other articles which in use are subjected to the action of strong soaps or alkalies.

The following table shows the improvement in speed of saturation obtained in a series of experiments comparing the impregnating speed of blown asphalt blended with from 1% to 7% of each of methyl abietate and hydrogenated methyl abietate. The data shown were obtained by impregnating strips of felt and asbestos paper in baths of the asphalt saturant held at 450° F. The times given are those required to effect complete saturation. The felt used was a mixture of cellulose and wool fibers such as is used in the manufacture of floor coverings and known in the trade as "felt base."

| Type of asphalt | Time required to saturate felt | Decrease in time required to saturate felt | Time required to saturate asbestos paper | Decrease in time to saturate asbestos paper |
| --- | --- | --- | --- | --- |
|  | Seconds | Percent | Min. Sec. | Percent |
| Blown asphalt 180°/200° F | 45 |  | 4   30 |  |
| Ditto but blended with 1% of hydrogenated methyl abietate | 40 | 11 | 3 | 33⅓ |
| Ditto but blended with 1% of methyl abietate | 40 | 11 | 3 | 33⅓ |
| Ditto but blended with 4% of hydrogenated methyl abietate | 35 | 22 | 2   20 | 48 |
| Ditto but blended with 4% of methyl abietate | 35 | 22 | 2   15 | 50 |
| Ditto but blended with 7% of hydrogenated methyl abietate | 30 | 33⅓ | 2 | 55 |
| Ditto but blended with 7% of methyl abietate | 30 | 33⅓ | 2 | 55 |

While the foregoing table indicates that the times for saturation with the unhydrogenated esters are approximately the same as those for the hydrogenated esters, I prefer to use the hydrogenated esters because they are essentially non-reactive with oxygen and therefore bring about a more stable product.

The addition of the esters of the present invention to bituminous materials results in greatly increased fluidity at temperatures above the melting point of the asphaltic material without correspondingly decreased melting point. The following table shows the effective reduction in viscosity accomplished by the incorporation of from 1 to 10% of methyl abietate or hydrogenated methyl abietate with untreated blown asphalt having a drop melting point of 206° F. (this was the asphalt indicated above as having a melting point of 180°/200° F.). The viscosities in this table were determined by means of the Koppers viscometer at 178° C. The percentage reduction in viscosity was calculated on the viscosity of the unmodified asphalt as compared to the viscosity of the blends.

| Amount and type of liquid ester added | Drop M. P. | Reduction in viscosity |
| --- | --- | --- |
|  | °F. | Per cent |
| Blank, no modifying agent | 206 |  |
| 1% hydrogenated methyl abietate | 201 | 17.8 |
| 1% methyl abietate | 203 | 11.3 |
| 4% hydrogenated methyl abietate | 188.6 | 44.6 |
| 4% methyl abietate | 192.2 | 43.5 |
| 7% hydrogenated methyl abietate | 183.5 | 59.2 |
| 7% methyl abietate | 185 | 59.1 |
| 10% hydrogenated methyl abietate | 174 | 68.5 |
| 10% methyl abietate | 176.5 | 70 |

In preparing the hot melt compositions in accordance with the present invention, I prefer to heat the asphaltic material to from about 50° F. to about 150° F. above its melting point and then to add slowly the liquid abietic ester with thorough stirring. Thereafter, the composition may be used directly or may be allowed to cool as desired. In making up the compositions described above, the air blown petroleum asphalt having a ring and ball melting point of 180°/200° F. and obtained from the Socony Vacuum Oil Company was heated to 300° F. whereupon the required amount of the liquid resin was admixed therewith with thorough stirring.

In addition to the formulations described in connection with the foregoing tables, the following examples are given.

Examples 1 to 3

Air blown asphalt of a ring and ball melting point of 180°/200° F. was blended with ethyl abietate by heating the asphalt to 300° F. and adding the resin thereto. The proportions employed were 99 parts asphalt and 1 part ethyl abietate, 96 parts asphalt and 4 parts ethyl abietate, and 93 parts asphalt and 7 parts ethyl abietate.

Examples 4 to 11

Steam reduced asphalt of a ring and ball melting point of 160°/170° F., obtained from the Socony Vacuum Oil Company was blended with methyl abietate and hydrogenated methyl abietate in the proportions indicated in the following table:

| Example No | 4 | 5 | 6 | 7 | 8 | 9 | 10 | 11 |
|---|---|---|---|---|---|---|---|---|
| Parts asphalt | 99 | 96 | 93 | 90 | 99 | 96 | 93 | 90 |
| Parts methyl abietate | 1 | 4 | 7 | 10 | | | | |
| Parts hyd. methyl abietate | | | | | 1 | 4 | 7 | 10 |

Examples 12 to 19

Hot melt compositions of gilsonite "super selects" obtained from the Allied Asphalt and Mineral Corporation with methyl abietate and hydrogenated methyl abietate in the proportions indicated in the following table were prepared by heating the gilsonite slowly to 350° F. and adding the specified amount of resin thereto with thorough stirring.

| Example No | 12 | 13 | 14 | 15 | 16 | 17 | 18 | 19 |
|---|---|---|---|---|---|---|---|---|
| Parts gilsonite | 99 | 96 | 93 | 90 | 99 | 96 | 93 | 90 |
| Parts methyl abietate | 1 | 4 | 7 | 10 | | | | |
| Parts hyd. methyl abietate | | | | | 1 | 4 | 7 | 10 |

The resulting gilsonite compositions were very satisfactory when used in the manufacture of mastic floor tiles.

In addition to the asphaltic material and the abietic ester, the compositions may contain other non-volatile components such as for example other fusible substantially non-volatile materials like resins such as coumarone indene resins, rosin, etc. or waxes, mineral oils and so forth. The compositions may contain suitable amounts of pigments such as iron oxide or other pigments. Fillers and aggregates may be admixed with the compositions such as graded stone, cork, asbestos, etc. While the principal use of the composition will be as an impregnant, it may be admixed with aggregates like cork or stone and molded or rolled into the desired shape. A composition comprising coumarone-indene resin, gilsonite, methyl abietate or hydrogenated methyl abietate, fillers and pigments, mixed in a Banbury mixer and molded yields excellent mastic floor tiles.

From the foregoing, it will be seen that the use of the abietic acid and hydrogenated abietic acid esters of the present invention as blending agents for asphaltic materials such as blown asphalt give rise to a number of very desirable advantages over prior art compositions of this type. In addition to the advantages mentioned above, the reduced degree of temperature susceptibility of the product which results in better flexibility at low temperatures is a decided advantage in favor of compositions of the present invention. Numerous other advantages of these compositions will be apparent to those skilled in the art.

It will be understood that the details and examples hereinbefore set forth are illustrative only and that the invention as broadly described and claimed is in no way limited thereby.

What I claim and desire to protect by Letters Patent is:

1. In a process for producing asphalt-saturated fibrous felts in which felted fibrous material selected from the group consisting of cellulose, wool, and asbestos fibers is placed in a bath of hot molten asphalt until impregnated thereby, then removed and permitted to cool to bring about solidification of the asphalt absorbed thereby, the improvement which consists in impregnating and saturating said felted fibrous material in a molten bath prepared by combining and melting asphaltic material substantially free of volatile material with from about 1% to about 10% of a lower aliphatic monohydric alcohol ester of a rosin acid selected from the group consisting of abietic and hydrogenated abietic acids, the percentages being by weight of the resulting blend, to increase the fluidity and saturation speed of the asphaltic material, whereby more efficient saturation of the felted material is obtained without causing embrittlement of the cold asphalt such as that caused by addition of rosin and like fluxes or causing undue softening such as that caused by addition of oils, fats and the like.

2. In a process for producing asphalt-saturated fibrous felts in which felted fibrous material selected from the group consisting of cellulose, wool, and asbestos fibers is placed in a bath of hot molten asphalt until impregnated thereby, then removed and permitted to cool to bring about solidification of the asphalt absorbed thereby, the improvement which consists in impregating and saturating said felted fibrous material in a molten bath prepared by combining and melting asphaltic material substantially free of volatile material with from about 1% to about 10% of a methyl ester of a rosin acid selected from the group consisting of abietic and hydrogenated abietic acids, the percentages being by weight of the resulting blend, to increase the fluidity and saturation speed of the asphaltic material, whereby more efficient saturation of the felted material is obtained without causing embrittlement of the cold asphalt such as that caused by addition of rosin and like fluxes or causing undue softening such as that caused by addition of oils, fats and the like.

RAYMOND F. SCHLAANSTINE.